(12) United States Patent
Gamage et al.

(10) Patent No.: US 12,314,570 B2
(45) Date of Patent: May 27, 2025

(54) SYSTEM, METHOD AND/OR DEVICE FOR MANAGING MEMORY DEVICES

(71) Applicant: Arm Limited, Cambridge (GB)

(72) Inventors: Sahan Sajeewa Hiniduma Udugama Gamage, Cambridge (GB); Fernando Garcia Redondo, Cambridge (GB); Jonas Švedas, Cambridge (GB)

(73) Assignee: Arm Limited, Cambridge (GB)

( * ) Notice: Subject to any disclaimer, the term of this patent is extended or adjusted under 35 U.S.C. 154(b) by 336 days.

(21) Appl. No.: 17/814,438

(22) Filed: Jul. 22, 2022

(65) Prior Publication Data

US 2024/0028213 A1    Jan. 25, 2024

(51) Int. Cl.
*G06F 3/00* (2006.01)
*G06F 3/06* (2006.01)
*G06F 12/02* (2006.01)

(52) U.S. Cl.
CPC .......... *G06F 3/0616* (2013.01); *G06F 3/0659* (2013.01); *G06F 3/0679* (2013.01); *G06F 12/0292* (2013.01); *G06F 2212/1036* (2013.01)

(58) Field of Classification Search
CPC .... G06F 3/0616; G06F 3/0659; G06F 3/0679; G06F 12/0292; G06F 2212/1036
See application file for complete search history.

(56) References Cited

U.S. PATENT DOCUMENTS

| | | | |
|---|---|---|---|
| 2015/0363329 A1* | 12/2015 | Precourt | G06F 12/0292 |
| | | | 711/207 |
| 2016/0196076 A1* | 7/2016 | Oh | G11C 16/26 |
| | | | 711/103 |

OTHER PUBLICATIONS

Kumar, et al, "Barrel Shifter," CMR Institute of Technology, https://www.coursehero.com/file/125042577/ref-2pdf/, Academic year 2011-2012, Jul. 2, 2012, 76 Pages.
Corsair, "USB Flash Wear-Leveling and Life Span," https://vdocuments.net/corsair-usb-flash-wear-leveling-and-life-span-faqs.html?page=1, Jun. 2007, 2 Pages.
Cactus Technologies, "Wear Leveling-Static, Dynamic and Global," White paper CTWP013, https://www.cactus-tech.com/resources/white-papers/, Oct. 12, 2013, 7 Pages.

* cited by examiner

*Primary Examiner* — Craig S Goldschmidt
(74) *Attorney, Agent, or Firm* — Berkeley Law & Technology Group, LLP

(57) ABSTRACT

Briefly, embodiments, such as methods and/or systems for employing memory devices.

20 Claims, 6 Drawing Sheets

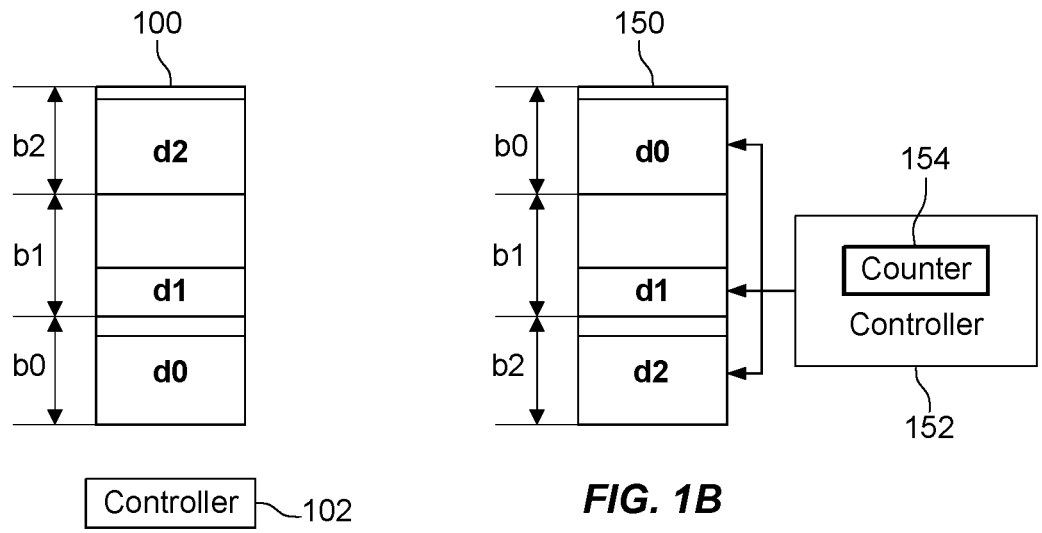
FIG. 1A  FIG. 1B
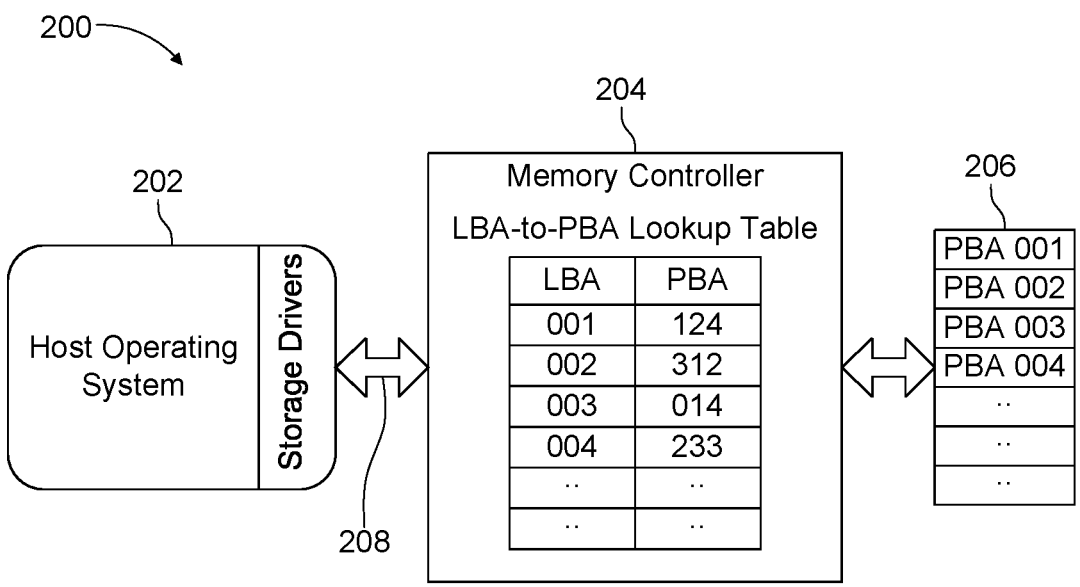
FIG. 2

SYSTEM, METHOD AND/DEVICE FOR MANAGING MEMORY DEVICES

BACKGROUND

1. Field

This disclosure relates to managing accesses to memory devices to enhance device longevity.

2. Information

Solid-state storage devices implemented in computing devices typically store data in blocks and/or defined physical memory partitions. A block of solid state memory can typically tolerate a finite number of program/erase cycles before becoming unreliable. For example, single-level cell (SLC) NAND flash is typically rated at between 50,000 and 100,000 program/erase cycles. Techniques such as wear leveling may arrange data on a solid state memory device such that write/erase cycles are distributed evenly among all of the blocks in the device.

BRIEF DESCRIPTION OF DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

FIG. 1A is a schematic diagram of a system to implement a dynamic wear leveling technique, according to an embodiment;

FIG. 1B is a schematic diagram of a system to implement a static wear leveling technique, according to an embodiment;

FIG. 2 is a schematic diagram of a computing device according to an embodiment;

Figure 3:
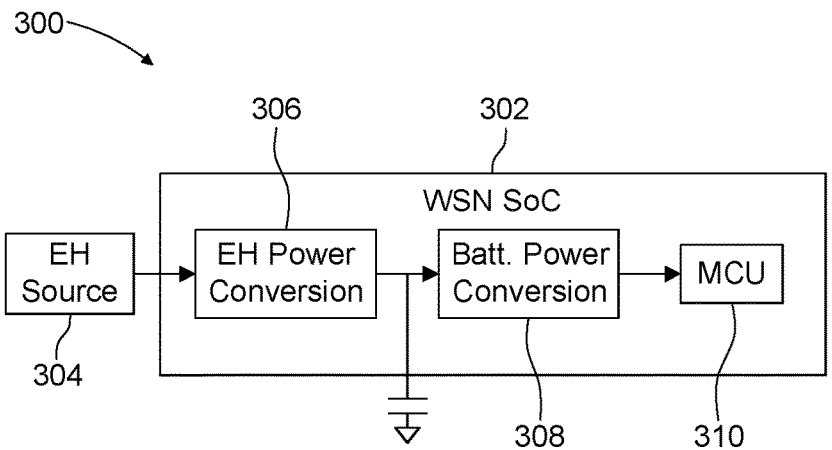
FIG. 3 is a schematic diagram of a computing device powered by an intermittent power source, according to an embodiment.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Furthermore, structural and/or other changes may be made without departing from claimed subject matter. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents. Further, it is to be understood that other embodiments may be utilized. Also, embodiments have been provided of claimed subject matter and it is noted that, as such, those illustrative embodiments are inventive and/or unconventional; however, claimed subject matter is not limited to embodiments provided primarily for illustrative purposes. Thus, while advantages have been described in connection with illustrative embodiments, claimed subject matter is inventive and/or unconventional for additional reasons not expressly mentioned in connection with those embodiments. In addition, references throughout this specification to "claimed subject matter" refer to subject matter intended to be covered by one or more claims, and are not necessarily intended to refer to a complete claim set, to a particular combination of claim sets (e.g., method claims, apparatus claims, etc.), or to a particular claim.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the patent application, particular context of description and/or usage provides helpful guidance regarding reasonable inferences to be drawn; however, likewise, "in this context" in general without further qualification refers to the context of the present patent application.

Wear leveling may be applied to a solid state memory device as a dynamic wear leveling (DWL) technique, as illustrated in FIG. 1A, in which a controller 102 selects locations in a memory 100 to write to for write operations (e.g., responsive to memory commands). Controller 102 may select locations in memory 100 to cyclically iterate write operations through blocks b0, b1, b2, . . . , such as in a round robin fashion. Alternatively, wear leveling may be applied to a solid state memory device as a static wear leveling (SWL) technique, as illustrated in FIG. 1B, in which a controller 152 selects blocks locations in a memory 150 to write to for write operations based on a count of how many times individual blocks, maintained at counter 154, have been accessed with write operations. Either DWL or SWL may be implemented in a computing device such as computing device 200 shown in FIG. 2 in which a memory controller 204 may execute operations to read from or write to physical locations in memory 206 responsive to commands received from host operating system 202 (e.g., executed by a host processor, not shown).

According to an embodiment, features of computing device 200 may be incorporated into microcontroller unit (MCU) 310 shown in computing device 300 shown in FIG. 3. Computing device 300 may comprise a system-on-a-chip (SoC) 302 formed on a single integrated circuit (IC) die to operate from an intermittent power source 304 which may include, for example, one or more solar cells and/or small wind generators, etc. SoC 302 may comprise energy conversion circuitry 306 to charge a battery during "energy rich" conditions (e.g., presence of wind and/or sunlight) to be used/discharged to perform operations during "energy lean" or "energy scarce" conditions (e.g., absence of wind and sunlight available for powering a device or recharging a battery).

Figure 4:
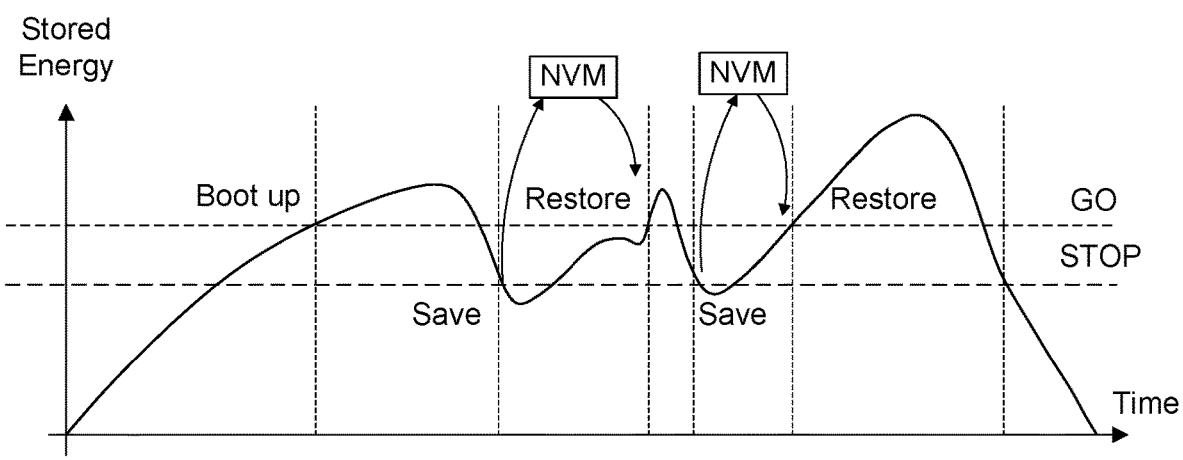
FIG. 4 is a plot of behavior of a computing device powered by an intermittent power source, according to an embodiment.
Figure 5:
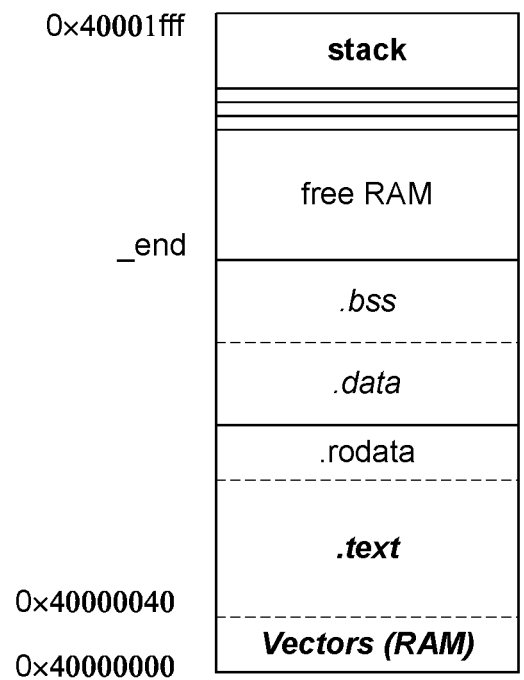
FIG. 5 is a schematic diagram of a partitioning of a main memory to be accessed by a computing device, according to an embodiment.

According to an embodiment, MCU 310 may transition to a lower power state (e.g., sleep mode) if a level of energy stored in a battery decreases to below a threshold level. In such a transition, MCU 310 may store a current processing state (e.g., from current internal parameters in processor registers and/or a system memory (e.g., RAM)) in a non-volatile memory (NVM). As illustrated in FIG. 4, MCU 310 may transition to reduced power and/or sleep state as energy stored in a battery drops below threshold STOP. According to an embodiment, MCU 310 may maintain parameters in a system memory and/or random access memory (RAM) according to memory map as shown in FIG. 5, for example.

Figure 6:
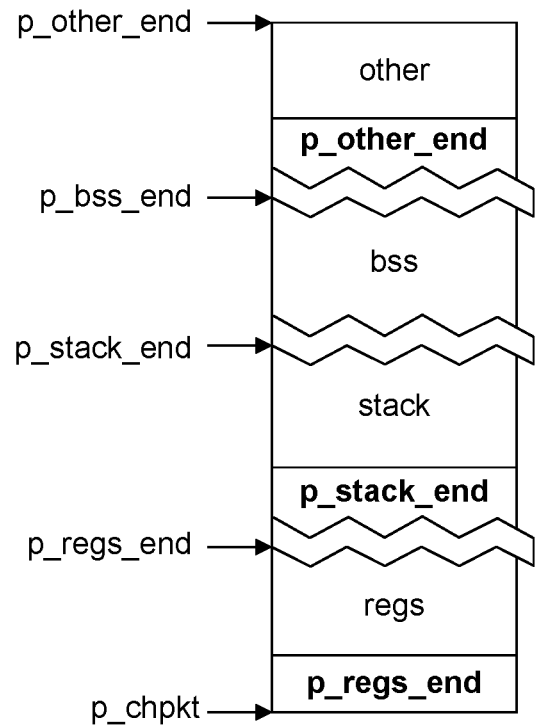
FIG. 6 is a schematic diagram showing a mapping of parameters to be stored in a non-volatile memory device, according to an embodiment.

As MCU 310 transitions to a reduced power and/or sleep state, parameters in system memory and/or RAM (e.g., parameters defined in stack, .bss, heap) and/or states of internal processor registers (e.g., general registers, PC register, LP register, etc.) may be stored in an NVM device as shown in FIG. 6 in a "checkpointing" operation. As shown in FIG. 6, parameters from system memory and/or RAM and/or internal processor register states may be stored in predetermined partitions of an NVM device defined, for example, by predetermined start and/or end addresses for partitions (e.g., p_bss_end, p_stack_end, p_regs_end as shown). As energy stored in a battery increases to be above threshold GO (e.g., from harvesting energy from source 304), MCU 310 may resume a full power state by, for example, retrieving parameters of a previous state stored in the NVM according to stored pointers, and loading the retrieved parameters to internal registers and/or system memory and/or RAM. For example, upon resuming to a full power state, MCU 310 may load parameters (e.g., in stack, .bss, heap, general registers, PC register, LP register, etc.) previously stored in predetermined partitions of an NVM device to system memory and/or RAM, and/or processor registers of MCU 310.

With rapid transitions between a reduced power/sleep state and a full power state, wear of an NVM device implemented at MCU 310 (e.g., to store parameters from system memory and/or RAM and/or states of internal processor registers) may be particularly stressed. Writing by 'blocks' using DWL and/or SWL may not guarantee portions of an NVM are to be written to evenly. It may be observed that certain portions of a word in memory may be written to more heavily as a particular workload may be prone to write bits more frequently to certain portions of the word in memory. In one example, during machine learning operations to train a neural network, least significant bits (LSBs) in a particular word may be written orders of magnitude more often than most significant bits (MSBs). Hence, such LSB positions of a word in memory may be disproportionally affected by endurance issues. In another example, quantization stages on machine learning workloads may shape activation distributions such that certain blocks of words may be more prone to have more "1"s more "0"s on binary symbols being stored. In another example, a different structure alignment introduced at compile time (different PRAGMA values) may result in certain bytes never being updated. Also, NVM writing/reading circuitry may introduce further alignment if a system data width (e.g., of system memory and/or RAM) is different from an NVM memory data width.

Figure 7A:
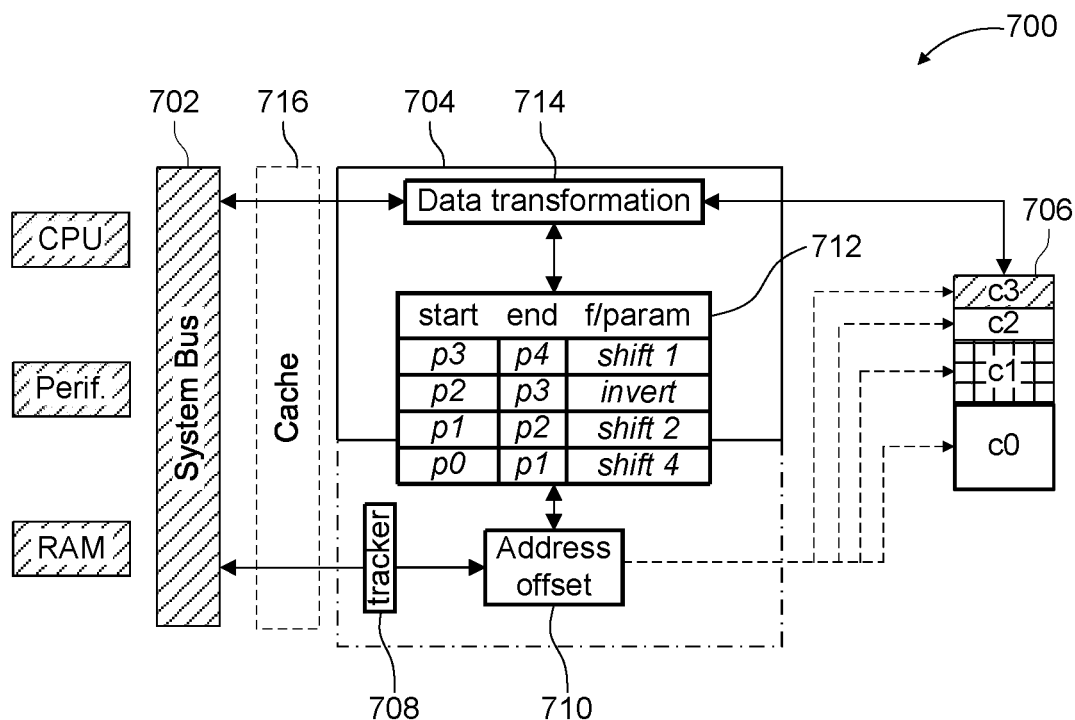
FIG. 7A is a schematic diagram of a computing device, according to an embodiment.
Figure 7B:
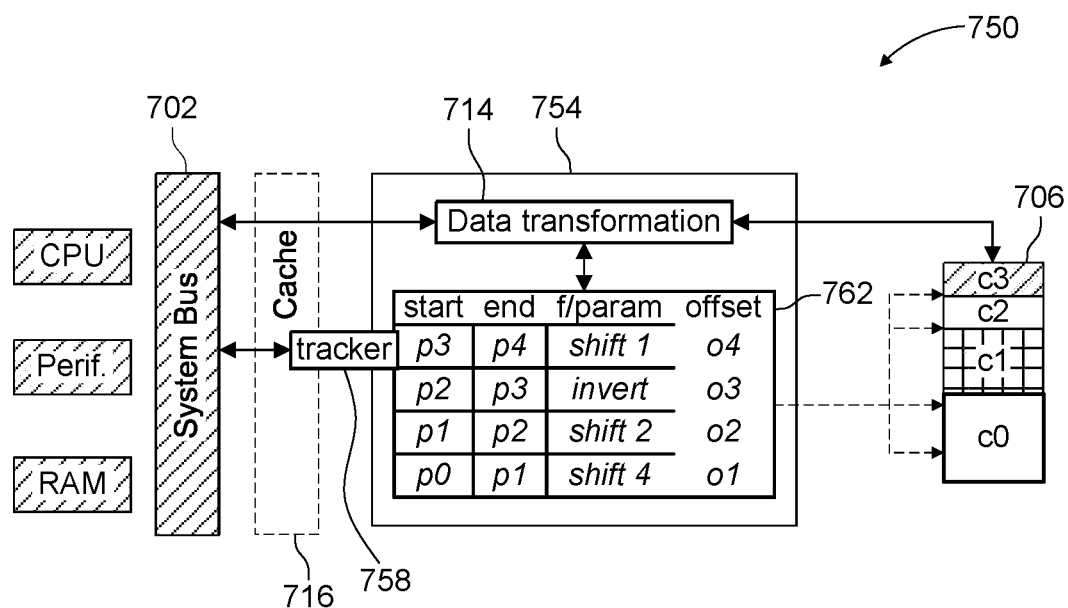
FIG. 7B is a schematic diagram of a computing device, according to an alternative embodiment.

According to an embodiment, computing devices 700 and 750 shown in FIGS. 7A and 7B may implement one or more techniques to ensure wear leveling for bit positions within a word defined in a physical memory device such as NVM device 706. In computing device 700 in FIG. 7A, a memory controller 704 may service memory commands and/or requests received from system bus 702 to, for example, access NVM device 706. Such memory commands and/or requests may comprise a request to write/store states to a block of NVM device 706. Such a command and/or request to write/store to a block of NVM device 706 may include, for example, specifying in a buffer defined in cache 716 1) signals and/or states to be written and/or 2) a location (e.g., address) in NVM device 706 that is to store the signals and/or states. Memory controller 704 may satisfy such a command/request to write/store states to a partition of NVM device 706 by, for example, completing one or more write operations to write/store states to partitions of NVM device 706. Such memory commands and/or requests may also comprise a command/request to read/retrieve states from a partition of NVM device 706. Memory controller 704 may satisfy such a command/request to read/retrieve states from a partition of NVM device 706 by, for example, completing one or more read operations to read/detect states from the partition of NVM device 706, and store the read/detected states in a buffer formed in cache 716 (e.g., to be transported by system bus 702).

According to an embodiment, table 712 and transformation circuit 714 may at least in part form a data control portion of memory controller 704. According to an embodiment, transformation circuit 714 may map values in binary symbol positions (e.g., bit positions) of a word to be written to NVM device 706 (e.g., from a memory command and/or request received from system bus 702) to different values in binary symbol positions of an addressable word location in NVM device 706. If values stored in the addressable word location in NVM device 706 (mapped to the different values in binary symbol positions) are to be retrieved/read (e.g., to service a subsequent memory command and/or request received from system bus 702), transformation circuit 714 may reverse map values retrieved/read from binary symbol positions in NVM device 706. Such reverse mapped values of the retrieved word may be identical to values in binary symbol positions specified by a memory command and/or request initiating write operation(s) to store the word in NVM 706. While transformation circuit 714 may be embedded in memory controller 704 as part of a hardware-based solution, in alternative implementations by a compiler (e.g., for programs hosted on a main computing device) may instead apply the aforementioned mappings and reverse mappings of binary symbols within a word.

In an implementation, NVM device 706 may be segmented into partitions c0, c1, c2 and c3 reserved for associated types of parameters (e.g., neural network weights, sensor signal samples, activation values, signals and/or states in partitions of RAM, internal register states, etc.) with different associated distributions of binary symbol values across symbol positions in addressable words formed in NVM device 706. Responsive to memory commands and/or requests to write/store signals and/or states to a block of NVM 706, transformation circuit 714 may apply different mapping functions to values of binary symbol positions to be physically stored depending on an associated type of parameters to be written/stored and/or a location (e.g., partition) in NVM device 706 to store the mapped values. Such different mappings to be applied by transformation circuit 714 may include, for example, barrel shift by a particular set number of binary symbol positions, shift by a random number of binary symbol positions, inversion, bit interleaving to a certain pattern, a combination of inversion and bit interleaving, just to provide a few examples of how transformation circuit 714 may map values at binary symbol positions of one word to values of binary symbol positions to be stored in a physical word defined in a partition of NVM device 706.

According to an embodiment, memory controller 704 may determine a particular mapping function to be applied by transformation circuit 714 in mapping symbol position values to be stored in addressable words in NVM device 706 based, at least in part, on entries in a table 712. In a particular implementation, table 712 associates partitions of NVM device 706 (e.g., partitions c0, c1, c2 or c3) with mapping functions to be applied in storing signals and/or states in those partitions. For example, table 712 determines that a shift 4 mapping is to be applied to a word to be physically stored in a partition between addresses p0 and p1, a shift 2 mapping is to be applied to a word to be physically stored in a partition between addresses p1 and p2, an inversion mapping is to be applied to a word to be physically stored in a partition between addresses p3 and p3, and a shift 1 mapping is to be applied to a word to be physically stored in a partition between addresses p3 and p4.

In one particular implementation, partition c0 may be configured to store values for neural network weights. For an initial N write operations to addressable words in partition c0, transformation circuit 714 may enable a copy of values of binary symbol positions to be stored with no transformation. In one scenario, suppose that six LSBs are particularly stressed over the N write operations. Following the initial N write operations (e.g., as tracked by tracker 708), transformation circuit 714 may commence applying a barrel shift by six symbol positions to values of binary symbol positions a set number for write operations N+1 to 2N. Following the initial 2N write operations may commence applying a barrel shift by twelve symbol positions to values of binary symbol positions a set number for write operations 2N+1 to 3N. Barrel shifts in increments six symbol positions may continue for subsequent corresponding multiples of N write operations.

In another particular example in which a system state (e.g., signals/states stored in system memory/RAM and/or internal processor register states) is repetitively stored to NVM in a checkpointing operation, a barrel shift of a random amount/increment may be applied to different partitions of NVM such as according to Table 1, for example.

TABLE 1

| Start | End | Mapping/function |
|---|---|---|
| p_s_0 | p_e_0 | Barrel shift by R0 |
| p_s_1 | p_e_1 | Barrel shift by R1 |
| ... | ... | ... |
| p_s_1 | p_e_1 | Barrel shift by R1 |

In a particular implementation, an amount/increment of a shift applied in the particular example of Table 1 may be random. This may ensure that locations in NVM are evenly written to physical bit positions over time, improving endurance.

In addition to mapping of symbol position values in a word to be stored in NVM 706, memory controller 704 may implement SWL and/or DWL within individual partitions c0, c1, c2 or c3. For example, address offset 710 may translate a location specified in a command and/or request to write to a block in a partition of NVM 706 (e.g., received from system bus 702) to an addressable block within the partition according to a SWL and/or DWL scheme. In a particular implementation, a command and/or request to write signals and/or states to a block in a partition of NVM 706 may be serviced at least in part by address offset 710 selecting a physical block within the partition of NVM 706 that is to be written to, and transformation circuit 714 mapping to values in symbol positions of a word that is to be stored in the physical block according to a mapping function specified in table 712. Responsive to a subsequent command and/or request to retrieve and/or read the written signals and/or states of the stored block, address offset 710 may once again translate to the physical block in the partition of NVM 706 (to enable directing a read operation to the physical block).

In the particular embodiment of computing device 700 shown in FIG. 7A, address offset 710 is formed in memory controller 704 as circuitry that is separate from transformation circuit 714. In a particular implementation, address offset 710 may control/determine signaling to be applied in read and write operations to NVM 706 (e.g., selection of particular wordlines and/or bitlines connected to cells formed in NVM 706). In an alternative embodiment, table 712 of computing device 700 may be modified to be table 762 as shown in computing device 750 (FIG. 7B) such that offsets to facilitate SWL and/or DWL in read/write operations are implemented in table 762. Here, signaling to be applied in read and write operations to NVM 706 may be determined, at least, in part, on offset values stored in table 762. According to an embodiment, tables may be formed in NVM 706, an always powered memory device (not shown) or an early populated (e.g., at power up) memory, just to provide a few examples.

Figure 8:
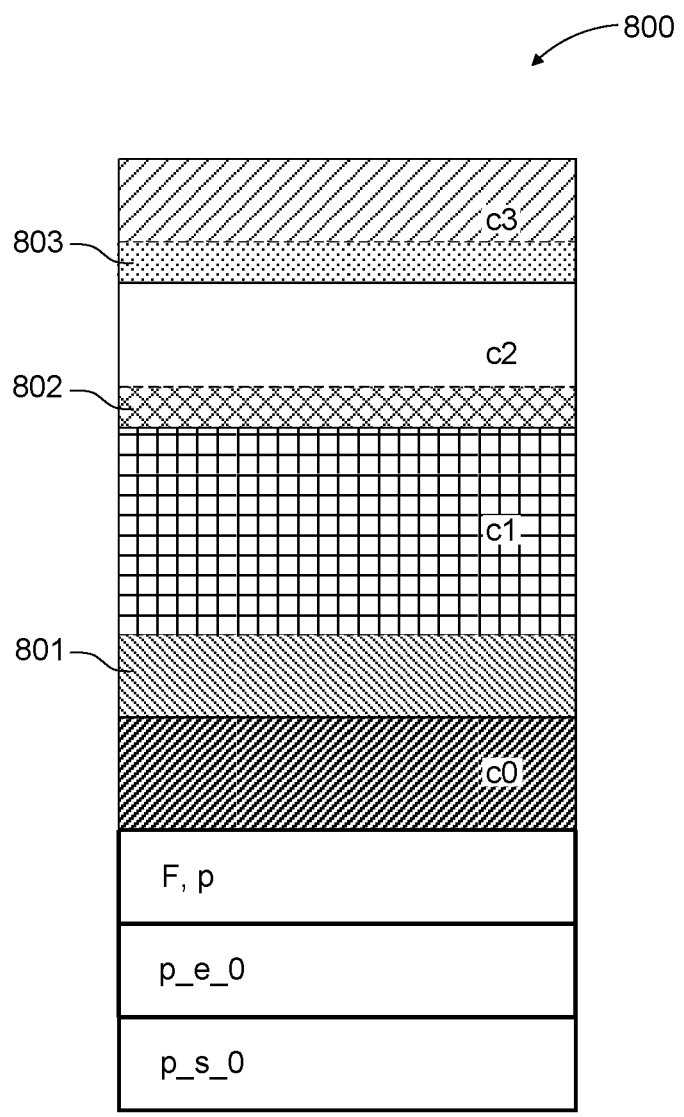
FIG. 8 is a schematic diagram of a memory storing a controller table, according to an embodiment.

In an alternative implementation, parameters maintained in table 712 (e.g., mapping partitions in NVM 706 to particular transformation functions to be applied by transformation circuit 714) may be expressed in NVM 706 as shown in NVM 800 of FIG. 8, for example. As shown the first two words in NVM 800 may contain pointers p_s_0 and p_e_0, starting and ending addresses of partition c0. Following access of a first and second words in NVM 800 to obtain p_s_0 and p_e_0 (e.g., starting and ending addresses of a partition storing "checkpointing" parameters including states of internal processor registers and/or values stored in system memory), a memory controller may verify that signals and/or states were properly/accurately stored in partition c0 from a transition to a sleep state. A word in NVM 800 at an address following words containing pointers p_s_0 and p_e_0 may contain an indication and/or code to represent a mapping/function that is to be applied in storing signals and/or states to words in partition c0 (e.g., between addresses p_s_0 and p_e_0). Indications and/or codes to represent mappings/functions to be applied in storing signals and/or states to words in partition c1 (e.g., between addresses p_s_1 and p_e_1), c2 (e.g., between addresses p_s_2 and p_e_2) and c3 (e.g., between addresses p_s_3 and p_e_3) may be similarly stored in portions 801, 802 and 803 of NVM 800, respectively.

According to an embodiment, storing pointers and/or an indication and/or code to represent a mapping/function as shown in FIG. 8 itself may lead to uneven stress/wear in NVM 800. In a particular implementation, responsive to a checkpointing operation, a test sequence may be stored at the beginning of each partition, which may then be read (e.g., to restore a system state following resume to full power). At a checkpointing event first such test sequence may be selected as "0x12345678." A barrel shift may then be applied in an amount/increment of four bits (e.g., selected randomly or by a tracker) such that an actual test sequence to be physically stored at the beginning of a partition will be "0x23456781." The same barrel shift may be applied to words to be stored in the partition (e.g., words containing the system state). In a subsequent operation to access words stored in the partition (e.g., to restore a system state), multiple reverse mapping functions (e.g., different reverse barrel shift operations) may be applied to the stored test sequence. A reverse mapping function that returns the original test sequence "0x12345678" may then be applied to remaining entries in the partition.

Figure 9:
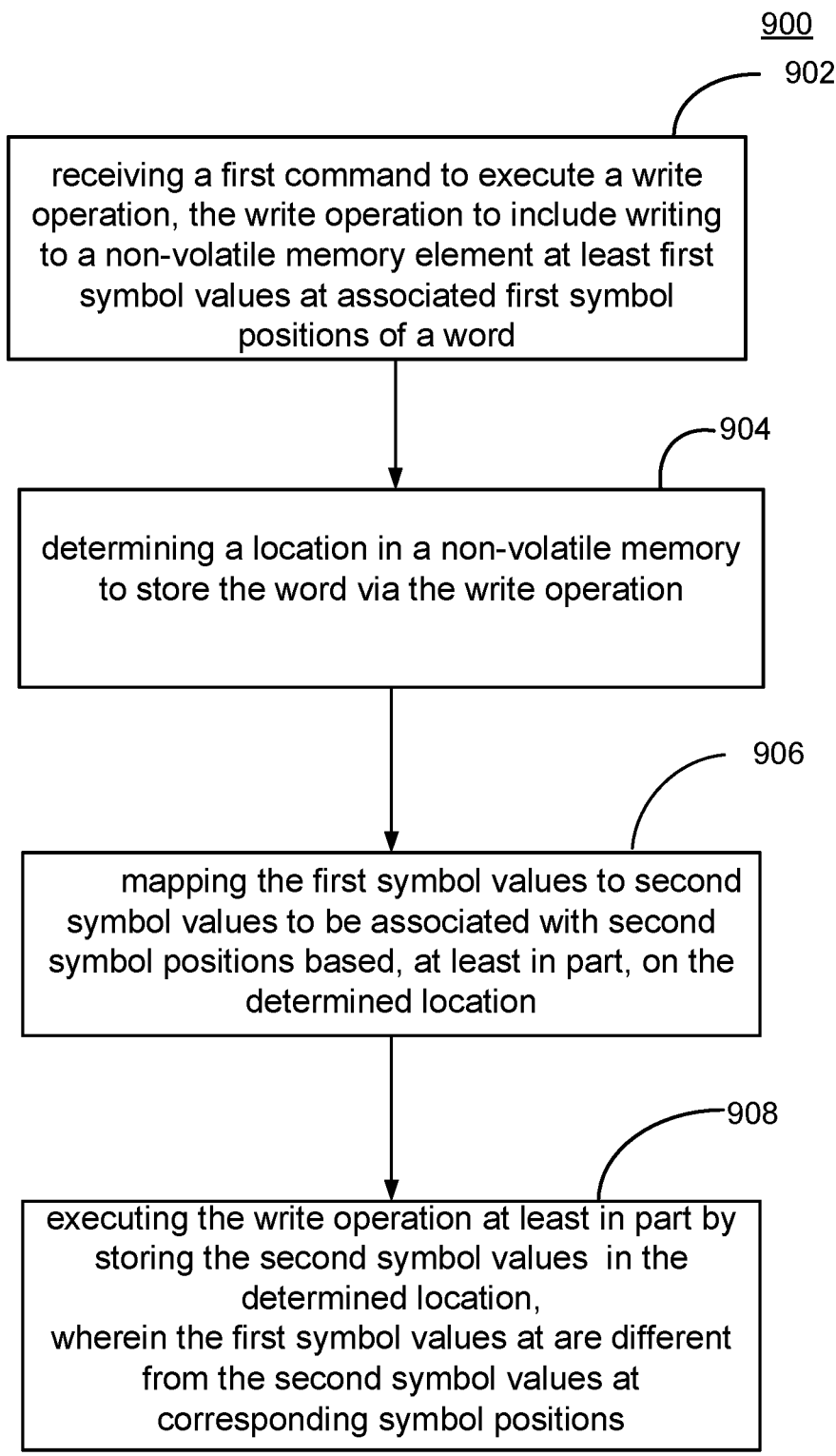
FIG. 9 is a flow diagram of a process to manage use of a memory device according to an embodiment.

FIG. 9 is a flow diagram of a process 900 to manage use of a non-volatile memory device. In particular implementations, actions and/or operations set forth in process 900 may be performed in whole or in part by a memory controller in a computing device, such as memory controller 704 or 754, for example. Block 902 may comprise receipt of a command and/or request (e.g., from system bus 702) to write and/or store signals and/or states to a memory such as NVM 706, for example. Such a command and/or request may specify one or more words (e.g., of a set fixed word length) having predetermined/set symbol positions (e.g., bit positions from least significant to most significant bit positions) to express and/or represent symbol values (e.g., bits as "0" or "1") associated with the symbol positions.

As pointed out above, a memory array (e.g., making up NVM 706) may be segmented into partitions associated with different types, purposes and/or functions to be associated with signals and/or states to be stored in the partitions. Block 904 may comprise determining a particular location in a non-volatile memory device that is to store an expression of the first symbol values (specified in the command received at block 902). For example, block 904 may associate an address specified in the command received at block 902 with a particular partition defined in the non-volatile memory.

Depending, at least in part, on a location determined at block 904, block 906 may map first symbol values specified in a command received at block 902 to second symbol values associated with second symbol positions to be maintained at the location determined at block 904. For example, depending on whether such a determined location is to be in a location c0, c1, c2 or c3 of NVM 706, transformation circuit 714 may execute block 904 to apply a mapping function (e.g., barrel shift, inversion, barrel shift in combination with inversion, etc.) to transform bits at bit positions of a word specified in a command received at block 902 to bits at bit positions of a word to be stored in NVM 706. Block 908 may then comprise storing the transformed bits in a location of NVM 706 determined at block 904.

In a particular implementation, blocks 902 through 908 may be executed in combination with a SWL and/or a DWL technique. For example, a location determined at block 904 may be determined, at least in part, by offset address 710, for example.

In a particular implementation, blocks 902 through 908 may be executed responsive to a transition of a computing device to a sleep state in which blocks stored in a system memory/RAM and/or states of internal processor registers are to be stored in the non-volatile memory. Following a write operation executed at block 908, a second command to execute a read operation to access the determined location may be received (e.g., responsive to a transition of the computing device from the sleep state to resume full power). To service the second command to execute the read operation, transformation circuit 714 may apply a reverse of the mapping applied at block 906 to recover the first symbol values at the first symbol positions, transformation circuit 714.

According to an embodiment, all or portions of computing devices 200, 300, 700 or 750 may be formed by and/or expressed in transistors and/or lower metal interconnects (not shown) in processes (e.g., front end-of-line and/or back-end-of-line processes) such as processes to form complementary metal oxide semiconductor (CMOS) circuitry, just as an example. It should be understood, however that this is merely an example of how circuitry may be formed in a device in a front end-of-line process, and claimed subject matter is not limited in this respect.

It should be noted that the various circuits disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Storage media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.).

If received within a computer system via one or more machine-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process (e.g., wafer fabrication process).

In the context of the present patent application, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, particularly a wireless network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, "coupled" is also used to mean that two or more tangible components and/or the like are not necessarily tangibly in direct physical contact, but are able to co-operate, liaise, and/or interact, such as, for example, by being "optically coupled." Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

Additionally, in the present patent application, in a particular context of usage, such as a situation in which tangible components (and/or similarly, tangible materials) are being discussed, a distinction exists between being "on" and being "over." As an example, deposition of a substance "on" a substrate refers to a deposition involving direct physical and tangible contact without an intermediary, such as an intermediary substance, between the substance deposited and the substrate in this latter example; nonetheless, deposition "over" a substrate, while understood to potentially include deposition "on" a substrate (since being "on" may also accurately be described as being "over"), is understood to include a situation in which one or more intermediaries, such as one or more intermediary substances, are present between the substance deposited and the substrate so that the substance deposited is not necessarily in direct physical and tangible contact with the substrate.

A similar distinction is made in an appropriate particular context of usage, such as in which tangible materials and/or tangible components are discussed, between being "beneath" and being "under." While "beneath," in such a particular context of usage, is intended to necessarily imply physical and tangible contact (similar to "on," as just described), "under" potentially includes a situation in which there is direct physical and tangible contact, but does not necessarily imply direct physical and tangible contact, such as if one or more intermediaries, such as one or more intermediary substances, are present. Thus, "on" is understood to mean "immediately over" and "beneath" is understood to mean "immediately under."

It is likewise appreciated that terms such as "over" and "under" are understood in a similar manner as the terms "up," "down," "top," "bottom," and so on, previously mentioned. These terms may be used to facilitate discussion, but are not intended to necessarily restrict scope of claimed subject matter. For example, the term "over," as an example, is not meant to suggest that claim scope is limited to only situations in which an embodiment is right side up, such as in comparison with the embodiment being upside down, for example. An example includes a flip chip, as one illustration, in which, for example, orientation at various times (e.g., during fabrication) may not necessarily correspond to orientation of a final product. Thus, if an object, as an example, is within applicable claim scope in a particular orientation, such as upside down, as one example, likewise, it is intended that the latter also be interpreted to be included within applicable claim scope in another orientation, such as right side up, again, as an example, and vice-versa, even if applicable literal claim language has the potential to be interpreted otherwise. Of course, again, as always has been the case in the specification of a patent application, particular context of description and/or usage provides helpful guidance regarding reasonable inferences to be drawn.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described.

To the extent claimed subject matter is related to one or more particular measurements, such as with regard to physical manifestations capable of being measured physically, such as, without limit, temperature, pressure, voltage, current, electromagnetic radiation, etc., it is believed that claimed subject matter does not fall within the abstract idea judicial exception to statutory subject matter. Rather, it is asserted, that physical measurements are not mental steps and, likewise, are not abstract ideas.

The terms "correspond", "reference", "associate", and/or similar terms relate to signals, signal samples and/or states, e.g., components of a signal measurement vector, which may be stored in memory and/or employed with operations to generate results, depending, at least in part, on the above-mentioned, signal samples and/or signal sample states. For example, a signal sample measurement vector may be stored in a memory location and further referenced wherein such a reference may be embodied and/or described as a stored relationship. A stored relationship may be employed by associating (e.g., relating) one or more memory addresses to one or more another memory addresses, for example, and may facilitate an operation, involving, at least in part, a combination of signal samples and/or states stored in memory, such as for processing by a processor and/or similar device, for example. Thus, in a particular context, "associating," "referencing," and/or "corresponding" may, for example, refer to an executable process of accessing memory contents of two or more memory locations, e.g., to facilitate execution of one or more operations among signal samples and/or states, wherein one or more results of the one or more operations may likewise be employed for additional processing, such as in other operations, or may be stored in the same or other memory locations, as may, for example, be directed by executable instructions. Furthermore, terms "fetching" and "reading" or "storing" and "writing" are to be understood as interchangeable terms for the respective operations, e.g., a result may be fetched (or read) from a memory location; likewise, a result may be stored in (or written to) a memory location.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be substantially present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present patent application merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

Example devices described herein may comprise features, for example, of a client computing device and/or a server computing device, in an embodiment. It is further noted that the term computing device, in general, whether employed as a client and/or as a server, or otherwise, refers at least to a processor and a memory connected by a communication bus. A "processor" and/or "processing circuit" for example, is understood to connote a specific structure such as a central processing unit (CPU), digital signal processor (DSP), graphics processing unit (GPU) and/or neural network processing unit (NPU), or a combination thereof, of a computing device which may include a control unit and an execution unit. In an aspect, a processor and/or processing circuit may comprise a device that fetches, interprets and executes instructions to process input signals to provide output signals. As such, in the context of the present patent application at least, this is understood to refer to sufficient structure within the meaning of 35 USC § 112 (f) so that it is specifically intended that 35 USC § 112 (f) not be implicated by use of the term "computing device," "processor," "processing unit," "processing circuit" and/or similar terms; however, if it is determined, for some reason not immediately apparent, that the foregoing understanding cannot stand and that 35 USC § 112 (f), therefore, necessarily is implicated by the use of the term "computing device" and/or similar terms, then, it is intended, pursuant to that statutory section, that corresponding structure, material and/or acts for performing one or more functions.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A method comprising:
receiving a first command to execute a write operation, the write operation to include writing to a non-volatile memory at least first symbol values at associated first symbol positions of a word;
determining, from a memory address specified in the received first command, a location in the non-volatile memory to store the word via the write operation;
selecting a mapping function based, at least in part, on the determined location;
mapping the first symbol values to second symbol values to be associated with second symbol positions according to the mapping function; and
executing the write operation at least in part by storing the second symbol values in the second symbol positions at the determined location,
wherein at least one first symbol value in at least one of the first symbol positions does not equal a second symbol value mapped to a corresponding one of the second symbol positions.

2. The method of claim 1, and further comprising:
responsive to a second command to execute a read operation, mapping the stored second symbol values to third symbol values in third symbol positions based, at least in part, on the determined location.

3. The method of claim 2, wherein the first symbol values in the first symbol positions match respective third symbol values in the third symbol positions.

4. The method of claim 1, wherein mapping the first symbol values to the second symbol values comprises mapping the first symbol values to different symbol positions.

5. The method of claim 1, wherein mapping the first symbol values to the second symbol values comprises inverting the first symbol values.

6. The method of claim 1, and further comprising selecting a word address in the location to store the second symbol values based, at least in part, on a wear leveling operation.

7. The method claim 1, and further comprising:
applying a plurality of reverse mapping functions to a word stored in the non-volatile memory to provide a plurality of results; and
determining the mapping function based, at least in part, on a match of at least one of the results with a test sequence.

8. The method of claim 1, and further comprising:
accessing the non-volatile memory to obtain pointers determining a partition in the non-volatile memory; and
determining the mapping function based, at least in part, on the determined partition.

9. A device comprising:
a non-volatile memory; and
a memory controller to:
receive a first command to execute a write operation, the write operation to include writing to a non-volatile memory at least first symbol values at associated first symbol positions of a word;
determine, from a memory address specified in the received first command, a location in the non-volatile memory to store the word via the write operation;
select a mapping function based, at least in part, on the determined location;
map the first symbol values to second symbol values to be associated with second symbol positions according to the mapping function; and
execute the write operation at least in part by storing the second symbol values in the second symbol positions at the determined location,
wherein at least one first symbol value in at least one of the first symbol positions does not equal a second symbol value mapped to a corresponding one of the second symbol positions.

10. The device of claim 9, wherein the memory controller is further to:
responsive to a second command to execute a read operation, map the stored second symbol values to third symbol values in third symbol positions based, at least in part, on the determined location.

11. The device of claim 10, wherein the first symbol values in the first symbol positions match respective third symbol values in the third symbol positions.

12. The device of claim 9, wherein the memory controller is further to map the first symbol values to the second symbol values by mapping the first symbol values to different symbol positions.

13. The device of claim 9, wherein the memory controller is further to map the first symbol values to the second symbol values at least in part by inverting the first symbol values.

14. The device of claim 9, wherein the memory controller is further to select a word address in the location to store the second symbol values based, at least in part, on a wear leveling operation.

15. The device of claim 9, wherein the memory controller is further to:
apply a plurality reverse mapping functions to a word stored in the non-volatile memory to provide a plurality of results; and
determine the mapping function based, at least in part, on a match of at least one of the results with a test sequence.

16. The device of claim 9, wherein the memory controller is further to:
access the non-volatile memory to obtain pointers determining a partition in the non-volatile memory; and
determine the mapping function based, at least in part, on the determined partition.

17. An article comprising:
a non-transitory storage medium comprising computer-readable instructions stored thereon that are executable by one or more processors of a computing device to:
express a memory controller, to be formed in a circuit device and to be coupled to a non-volatile memory, the memory controller to comprise:
circuitry receive a first command to execute a write operation, the write operation to include writing to a non-volatile memory at least first symbol values at associated first symbol positions of a word;
circuitry to determine, from a memory address specified in the received first command, a location in the non-volatile memory to store the word via the write operation;
circuitry to select a mapping function based, at least in part, on the determined location;
circuitry to map the first symbol values to second symbol values to be associated with second symbol positions according to the mapping function; and
circuitry to execute the write operation at least in part by storing the second symbol values in the second symbol positions at the determined location,
wherein at least one first symbol value in at least one of the first symbol positions does not equal a second symbol value mapped to a corresponding one of the second symbol positions.

18. The article of claim 17, wherein the memory controller is further to comprise:
circuitry to, responsive to a second command to execute a read operation, map the stored second symbol values to third symbol values in third symbol positions based, at least in part, on the determined location.

19. The article of claim 18, wherein the first symbol values in the first symbol positions match respective third symbol values in the third symbol positions.

20. The article of claim 17, wherein the memory controller is further to comprise circuitry to map the first symbol values to the second symbol values by mapping the first symbol values to different symbol positions.

* * * * *